UNITED STATES PATENT OFFICE.

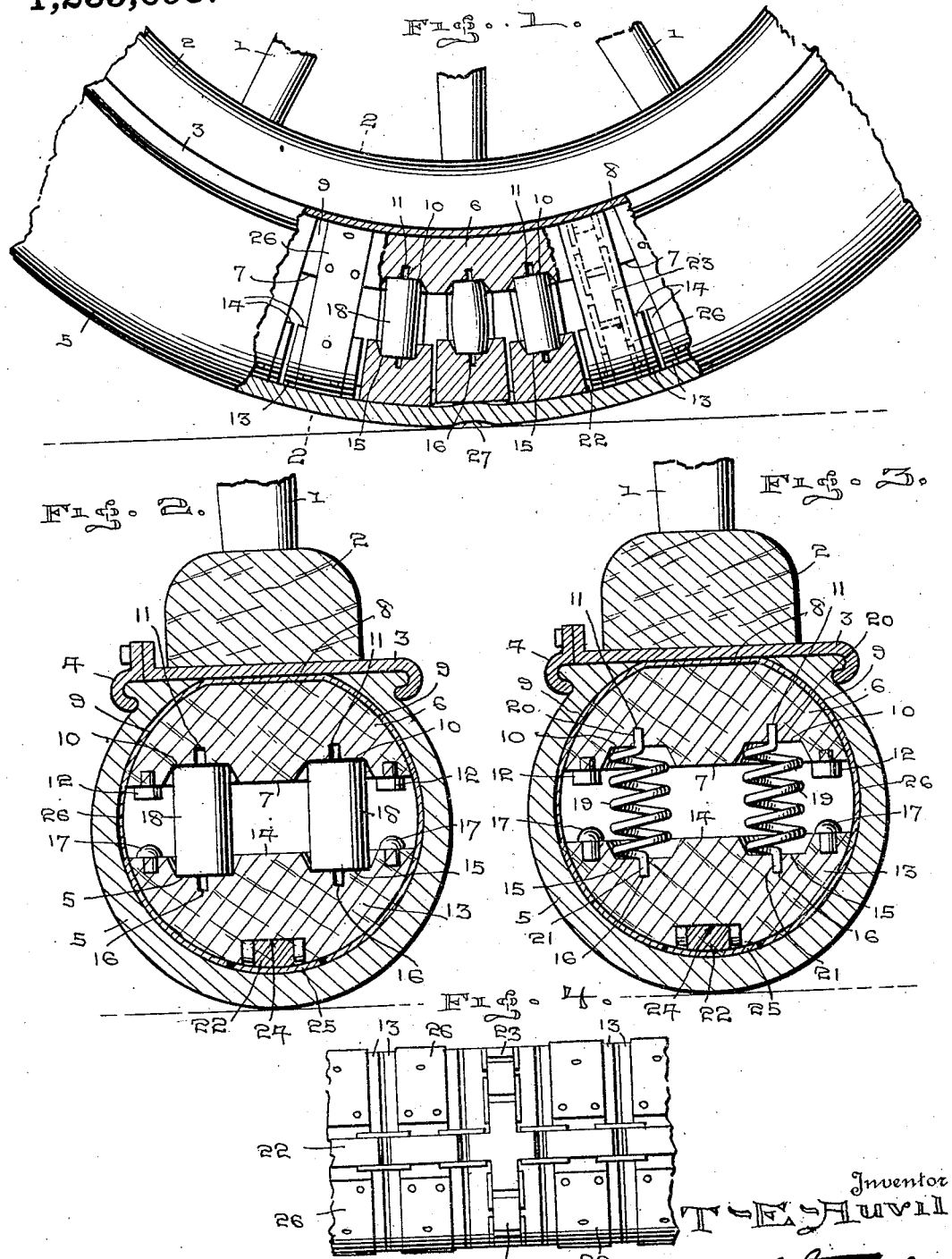

TROY E. AUVIL, OF BALTIMORE, MARYLAND.

WHEEL-TIRE.

1,235,093.  Specification of Letters Patent.  Patented July 31, 1917.

Application filed July 10, 1916.  Serial No. 108,382.

*To all whom it may concern:*

Be it known that I, TROY E. AUVIL, a citizen of the United States, residing at Baltimore city, in the county of Baltimore and State of Maryland, have invented certain new and useful Improvements in Wheel-Tires; and I do hereby declare the following to be a full, clear, and exact description of the invention, such as will enable others skilled in the art to which it appertains to make and use the same.

This invention relates to wheel tires, and more particularly to a tire for use upon an automobile wheel and the like.

One of the objects of this invention is the provision of a tire provided with cushioning means whereby to preserve the resiliency of the tire and at the same time to obviate jars occasioned by the tire coming into contact with obstructions in the road way and the like.

Another object of this invention is to provide the tire with coöperating factors one of which is composed of movable sectors having resilient cushion means arranged between them and the other factor for receiving the jar when contacting with an obstruction without distributing the force of the impact to the other of the sectors.

Another object of this invention is to provide the tire with coöperating factors maintained in operative spaced relation to each other by the interpositioning of resilient members therebetween, one of said factors consisting of a plurality of independently movable sectors for individually receiving the force of impact without distributing the jar throughout the remaining sectors of the tire and the wheel.

Another object of this invention is to provide the tire with coöperating factors provided with means for mounting interchangeable resilient members therebetween when desired.

Another object of this invention is to provide the coöperating factors of the tire with means for reinforcing the same and for maintaining the factors in operative relation to each other.

Another object of this invention is to provide the coöperating factors of the tire with means for preventing sudden impact between the coöperating factors should the resilient members reach a maximum degree of compression.

A further object of this invention is to provide a tire of this character possessing the foregoing advantages and results and which is nonpuncturable, efficient and durable, and which can be manufactured and sold upon the market at a nominal cost.

These and other objects and advantages will more fully appear as the nature of the invention is more clearly understood from the following specification, the subject matter of the claims, and the views illustrated in the accompanying drawings, in which, Figure 1 is a fragmentary side view of the lower portion of the wheel, partly broken away and shown in section, showing the detail construction of the tire as mounted upon the wheel.

Fig. 2 is a vertical transverse sectional view on line 2—2 of Fig. 1, showing a further detail construction of the tire and illustrating the mounting of the resilient members which I may employ.

Fig. 3 is a similar view to Fig. 2, showing the mounting of the springs which I may employ in lieu of the resilient members shown in Fig. 2.

Fig. 4 is a fragmentary top plan view of the tire, with the tire casing and a portion of the flexible material removed, showing the construction and mounting of the chain which I employ in my tire construction.

Referring to the drawings, wherein similar reference characters denote corresponding parts throughout the several views, 1 denotes the spokes of the wheel, 2 the wheel felly, 3 the wheel rim, provided with the clencher ring 4 for securing the tire casing 5 upon the rim 3 of the wheel.

Within the tire casing 5 is positioned the inner factor or core 6 continuous throughout its length around the circumference of the wheel and formed with the flat outer face 7, the flat inner face 8 and the curved side walls 9, as shown in Fig. 2. Formed in the outer face 7 of the inner factor or core 6 are the plurality of recesses 10 provided with diverging side walls and the sockets 11 in the bottoms thereof, and suitably secured upon the outer face 7 of the inner factor or core 6 adjacent the edges thereof are a plurality of buffer blocks 12 having preferably flat heads or faces.

Positioned within the outer casing 5 of the tire and in spaced relation to the inner factor or core 6 is the outer coöperating factor or core. This outer factor or core consists of the plurality of sectors 13 formed with their outer faces substantially semi-circular in the transverse direction of the tire, and the flat inner faces 14, the inner faces 14 of the sectors 13 being provided with the recesses 15 provided with diverging side walls and the sockets 16 formed in the bottoms thereof, and suitably secured upon the inner faces 14 of the sectors 13 and adjacent their ends are the buffer blocks 17 formed preferably with rounded heads or faces.

Interposed between the inner sector or core 6 and the sectors 13 of the outer factor, and having their inner ends seated within the recesses 10 of the factor or core 6 and their outer ends seated in the recesses 15 of the sectors 13 are the resilient compression members 18 shown in Figs. 1 and 2, and which members 18 are formed preferably of rubber, or there may be interposed between the inner factor or core 6 and the sectors 13 of the outer factor, if desired, the resilient compression springs 19 shown in Fig. 3, the springs 19 having their inner and outer end portions positioned respectively within the recesses 10 of the inner factor or core 6 and the recesses 15 of the sectors 13, the ends of the springs 19 being formed with the inner stems 20 for seating in the sockets 11 of the inner factor or core 6 and the outer stems 21 for seating in the sockets 16 of the sectors 13.

The resilient compression members 18, or the resilient compression springs 19, normally maintains the inner factor or core 6 and the sectors 13 of the outer core in operative spaced relation to each other, and for reinforcing the inner and outer factors, as well as for maintaining the factors in coöperative relation with each other and at the same time to prevent the displacement of the compression members, whether it be the members 18 or the springs 19, the longitudinal chain 22, formed with the transverse chains 23 at intervals thereon, is provided. The chain 22 extends entirely around the outer faces of the sectors 13 and is seated in the recesses 24 formed centrally in the outer curved faces of the sectors 13 and in alinement with each other, the recesses 24 being of sufficient depth that the outer surface of the chain 22 will lie flush with the outer curved surfaces of the sectors 13. The transversely disposed chains 23 upon the chain 22 are arranged at intervals thereon so that the same will engage preferably every fifth sector 13 and the adjacent portions of the inner factor or core 6 and these chains 23 are also countersunk or seated in recesses formed in the curved faces of the sectors 13 and the curved sides of the inner factor or core 6 and also in a manner that the outer surfaces of the chains 23 will lie flush with the outer surfaces of the sectors 13 and the inner factor or core 6, the chain 22 and the chains 23, of course, being suitably secured in the respective recesses.

In addition to the chains 22 and 23 to provide for the reinforcement and maintenance of the inner and outer factors within the tire casing 5, I also provide centrally upon the outer faces of the sectors 13 the flexible longitudinal strip 25 which extends entirely around the outer faces of the sectors 13 and is of a greater width than the chain 22, and connecting each of the sectors 13 with the inner factor or core 6 are the plurality of flexible side strips 26, the side strips 26 embrace the remaining portions of the outer faces of the sectors 13 and the curved side walls of the inner factor or core 6. The strip 25 and the strips 26 are formed of canvas, leather, or other suitable flexible material and while the same assists in the reinforcement and maintenance of the inner and outer factors, the same also provides an efficient protecting medium for preventing wear of the inner wall of the outer tire casing 5 by the inner and outer factors and the chains 22 and 23 coming into contact and abrading and marring the inner wall of the tire casing 5. The strips 25 and 26, however, may be seated in the outer walls of the sectors 13 and the side walls of the inner factor or core 6 by forming suitable recesses therein if preferred, but the same must not be seated therein to such a depth as to destroy their efficiency as a protective medium. The strips 25 and 26 are suitably secured upon the inner and outer factors in any suitable manner such as by the use of tacks, nails, or screws.

While I preferably form the inner factor or core 6 and the sectors 13 of the outer factor or core of any suitable wood, I may also form these factors of suitable solid metal, and while I have shown the use of two of the resilient members 18 shown in Fig. 2 or two of the resilient springs 19 shown in Fig. 3 between each of the sectors 13 and the inner factor or core 6, I desire it to be understood that I may interpose between each of the sectors 13 and the inner core 6 a greater or less number of the resilient members 18 or the resilient springs 19.

From the foregoing disclosure and description of my invention it is manifestly clear that my wheel tire has many advantages over the tires now in use, in view of the fact, that by forming the inner core 6 and the sectors 13 in the manner shown and described that the same are universal in their use, so that the device may be readily formed into a cushion wheel by the use of the resilient members 18 or readily transformed into a spring wheel by the use of the resilient springs 19 or the tire may be readily formed in a combination of both, and by the provision of the buffer members 12 and 17 the sectors 13 and core 6 are relieved of sudden impact should the compression members therebetween reach their maximum degree of compression from any cause, and by forming the inner core 6 with the flat inner face 8 for engaging the periphery of the rim 3 efficiently prevents the inner and outer cores becoming laterally displaced or turning within the tire casing 5. Another feature of this invention resides in the fact that the sectors 13 of the outer core are independently movable with respect to each other so that when one of the sectors 13 should encounter stones or other obstructions in the road way as indicated at 27 in Fig. 1, the sectors 13 which contacts therewith will be moved independently inwardly as illustrated in Fig. 1, thereby preventing the force of impact being distributed to other portions of the tire and wheel whereby occupants of the vehicle will not feel the jar.

Having described my invention, what I claim as new and desire to secure by Letters Patent, is:—

1. In a device of the character described, the combination with a wheel and the rim and the tire casing therefor, of an inner circumferential core within said casing, an outer circumferential core within said casing comprising independently movable sectors, resilient means interposed between said inner core and said sectors, flexible strips connecting said inner core and said sectors together, and flexible means extending circumferentially of said outer core and connecting all of said sectors together.

2. In a device of the character described, the combination with a wheel and the rim and the tire casing therefor, of an inner circumferential core within said casing, and an outer circumferential core within said casing comprising independently movable sectors, resilient means interposed between said inner core and said sectors, flexible means connecting said inner core and said sectors together, flexible reinforcing means extending circumferentially of said outer core and connecting all of said sectors together, and flexible reinforcing means extending transversely around certain of said sectors and attached to said circumferentially extending flexible reinforcing means.

3. In a device of the character described, the combination with a wheel and the rim and the tire casing therefor, of an inner circumferential core within said casing and an outer circumferential core within said casing comprising independently movable sectors, resilient means interposed between said inner core and said sectors, flexible means connecting said inner core and said sectors together, each of said sectors formed in its outer surface with a recess, and a reinforcing chain disposed in the recesses of said sectors and extending circumferentially of the outer core and connecting all of said sectors together.

4. In a device of the class described, the combination with a wheel and the rim and the tire casing therefor, of an inner circumferential core within said casing, an outer circumferential core within said casing comprising independently movable sectors, cushion means interposed between said inner core and said sectors, flexible means connecting said inner core and said sectors together, each of said sectors formed with a recess, a reinforcing chain extending circumferentially of said outer core and disposed in said recesses, and a flexible circumferentially extending strip disposed over said reinforcing chain and attached to each of said sectors for the purpose set forth.

In testimony whereof I have signed my name to this specification in the presence of two subscribing witnesses.

TROY E. AUVIL.

Witnesses:
CHAS. E. LENZ,
BERTHA HELLBACH.

Copies of this patent may be obtained for five cents each, by addressing the "Commissioner of Patents, Washington, D. C."